Jan. 19, 1932.  D. ANDREASEN  1,842,060

POWER HARROW

Filed July 31, 1929

INVENTOR,
Ditlev Andreasen.
BY
David E. Lain,
ATTORNEY.

Patented Jan. 19, 1932

1,842,060

UNITED STATES PATENT OFFICE

DITLEV ANDREASEN, OF FERNDALE TOWNSHIP, WHATCOM COUNTY, WASHINGTON

POWER HARROW

Application filed July 31, 1929. Serial No. 382,317.

My invention relates to improvements in power harrows the kind in which the teeth are disposed on the surface of a revoluble drum, and has for a principal object to provide a harrow capable of reducing ploughed sod, and the like, to a condition suitable for a seed bed at one operation and also adapted for general use in preparing the soil for a crop.

The invention resides in the shapes and adjustable fastenings for the teeth as well as in the general assemblage of parts to make the desired objects possible.

Figure 1:
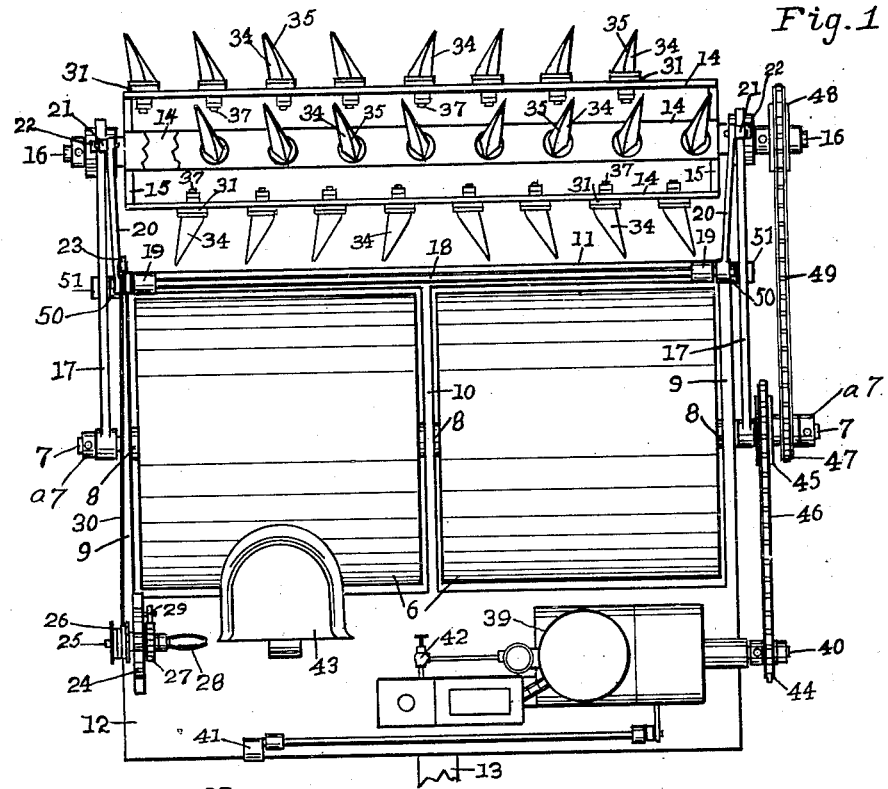
Figure 2:
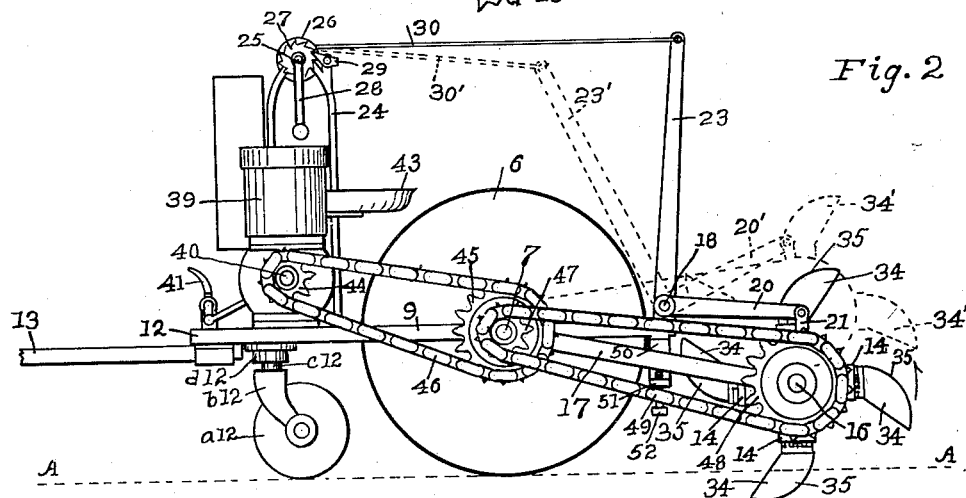
Figures 3, 4, 5:
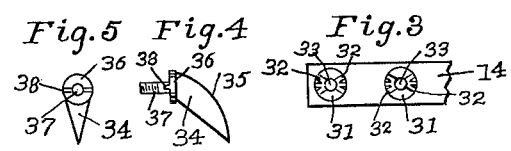

I attain these and other objects of my improvement with the mechanism illustrated in the accompanying sheet of drawings, forming a part of this specification, in which Figure 1 is a plan view of my harrow, Fig. 2 is an end elevation thereof, Fig. 3 is a plan view of one of the tooth bars, a part of which is broken away, Fig. 4 is a side elevation of one of the harrow teeth and Fig. 5 is a bottom or inner end view of said tooth.

Similar characters refer to similar parts throughout.

With more particular reference to the designated parts: A large roller 6, preferably in two parts as shown, is mounted for revolution on shaft 7 which is fastened at 8, 8, 8 to frame bars 9, 9 and 10. At the rear of the roller said bars are joined by back frame bar 11 and at the front by platform 12. Centrally to the front of said platform is fastened tongue 13 the major part of which is broken away for lack of space.

A skeletonized tooth drum consists of four parallel tooth bars 14 equally spaced on the surface of a cylinder the ends of which are fastened to heads 15, 15 which are fastened to shaft 16, in the axis of said cylinder, the ends of which project beyond said heads. One end of each of links 17, 17 is mounted for oscillation on shaft 7 and the other end is provided with a universal ball bearing in which is mounted shaft 16 for revolution.

Shaft 18 is mounted for oscillation in bearings 19 fastened to back frame bar 11. The ends of shaft 18 are within the space between links 17, 17. On each end of shaft 18 is fastened one end of one of arms 20 the other end of which projects rearward to overhang the rear end of one of links 17 with which it is connected by link 21 pivoted thereto and to lug 22 on top of said link 17. Fastened to one end of shaft 18 is lever 23 projected upward.

A tall bearing bracket 24 is fastened to the right-hand end of platform 12 and in its top is mounted shaft 25 for revolution. On the outer end of shaft 25 is fastened drum 26 and on the inner end thereof is fastened handle 28. Between said handle and bearing is fastened ratchet 27 on said shaft with which may engage pawl 29 pivoted to said bearing bracket. One end of cable 30 is fastened to drum 26 and wound thereon while the other end thereof is fastened to the upper end of lever 23.

At longitudinally spaced distances on the external surface of each of bars 14 are bosses 31 each of which is provided with a plurality of radial grooves 32. Centrally through each boss and the bar on which it is located is hole 33.

The harrow teeth 34 may be similar and of wedge shape cross section, as shown, with the thin edge forward and slanting backward in a sector as at 35. At the base of the tooth is flange 36 with threaded stud 37 centrally disposed and projected normal from said flange. On the lower or inner side of said flange is diametrical rib 38 to engage in any one of grooves 32 when said stud is extended through one of holes 33. The angularity of the groove 32 with which rib 38 is engaged will determine the pitch of the tooth on the drum. In practice a greater number of grooves 32 than are shown may be used. Thus providing for setting the teeth at any useful pitch desired. When stud 37 is in place in hole 33 it is secured by a nut or better by a nut and set nut as shown.

Prime mover 39 is preferably located at the left hand on platform 12 to counterbalance the weight of the driver when in seat 43. The illustrated prime mover is intended to represent a gas engine with which, for the sake of simplicity of the drawings, but few of the usual appurtenances are shown. However, since this part of the apparatus enters into my invention simply as a source of power, enough is shown to make clear my invention.

Engine 39 has shaft 40, clutch control 41 and gas valve 42. The latter is preferably located within reach of the driver when on said seat 43 which is preferably fastened on platform 12 near its right-hand end. On the outer end of engine shaft 40 is fastened chain sprocket wheel 44 and in belting relation therewith is mounted for revolution sprocket wheel 45 on roller shaft 7. With said sprockets 44 and 45 is engaged chain 46 in driving relation. Rigidly fastened to sprocket 45 is sprocket wheel 47 also thus revoluble on shaft 7. Said combined sprockets are retained in place by set ring $a7$ fastened on the outer end of said shaft. A similar set ring $a7$ is fastened on the other end of shaft 7 to retain link 17 in place thereon. Sprocket wheel 48 is fastened on one end of shaft 16 in chain relation with sprocket 47 and the two are engaged in driving relation by chain 49 thereover.

The construction is such that when engine shaft 40 revolves with sufficient power rotating harrow teeth 34 may be driven in the direction indicated by the arrow in Fig. 2 when the lower teeth on the drum are below the soil the upper surface of which is indicated by a dotted line A—A in said Fig. 2. When thus driven the engagement of the teeth with the soil will aid in moving the implement forward, will enter and leave the soil with a "drawing" stroke thus promoting ease of operation and freedom from dirt throwing. The wedge shape of teeth forces the soil apart as they move therethrough and, when set at a pitch, as illustrated, the soil is moved laterally to the movement of the harrow as when working the soil with a disc cultivator.

By revolving handle 28 cable 30 may be wound up thereon thus moving lever 23 to 23' and the harrow drum to its upper dotted-line position with the teeth thereof at 34' far enough above the ground to be in position of portability. Meanwhile pawl 29 will engage with a ratchet tooth to retain the harrow teeth at any desired position in elevation. Also by releasing the engagement of the pawl the harrow teeth may be lowered by handle 28 to the desired operative position.

Underneath platform 12 on suitable bearings are mounted one or more wheels to maintain the frame of the machine in substantially level position. A caster wheel $a12$ is shown mounted for revolution in bearings in the lower ends of fork $b12$ which is swiveled for revolution around a vertical axis on stud $c12$ mounted in a bearing $d12$ fastened beneath said platform. Tongue 13 may be removed and connection with a tractor be substituted.

Rollers 6 and said castor wheel in contact with the ground determine the position of the frame and platform relative to the ground surface. Fastened beneath and at the rear ends of frame bars 9, 9 are L shape stop brackets and guides to limit both the lateral and downward movements of the rear ends of links 17, 17. The stems of these brackets are shown at 50, 50 and are disposed to serve as guides to prevent too free lateral swinging of said links and consequently of the harrow frame and teeth. The horizontal part 51 of each of said brackets projects outward and has stop screw 52 engaged therein vertically disposed with its upper end bearing on the bottom edge of the link adjacent thereto to limit the downward swing thereof. The setting of screws 52 determine the depth to which teeth 34 may enter the soil, and when in operation cable 30 is slackened to allow links 17 to bear on said stop screws thus placing the weight of the harrow structure on the roller frame and relieving said cable 30 thereof.

Having thus disclosed my invention, what I claim as new therein and desire to secure by Letters Patent is,—

A rotary harrow tooth consisting of a tooth body tapering from the base to the outer end thereof having a triangular cross section slanting backward and having a rib on the base end adapted to engage in a groove in a harrow drum bar, and a stud projected from said base end adapted to be extended through holes in said drum bar having threads thereon to engage nuts to clamp said tooth to said bar.

DITLEV ANDREASEN.